United States Patent [19]

Saitoh

[11] Patent Number: 5,048,787
[45] Date of Patent: Sep. 17, 1991

[54] SLIDE RAIL FOR AUTOMOTIVE SEAT

[75] Inventor: Seishiroh Saitoh, Akishima, Japan

[73] Assignee: Tachi-S Co., Ltd., Tokyo, Japan

[21] Appl. No.: 507,152

[22] Filed: Apr. 10, 1990

[51] Int. Cl.⁵ ............................................. F16M 13/00
[52] U.S. Cl. ...................................... 248/430; 296/65.1
[58] Field of Search ................. 248/429, 430; 296/65.1

[56] References Cited

U.S. PATENT DOCUMENTS

| | | | |
|---|---|---|---|
| 4,168,051 | 9/1979 | Terada | 248/429 |
| 4,478,383 | 10/1984 | Urai | 248/429 |
| 4,730,804 | 3/1988 | Higuchi et al. | 248/429 |
| 4,756,503 | 7/1988 | Fujita | 296/65.1 X |
| 4,776,551 | 10/1988 | Nishino | 248/429 |
| 4,804,229 | 2/1989 | Nishino | 248/430 X |
| 4,817,904 | 4/1989 | Munakata et al. | 248/429 |
| 4,821,991 | 4/1989 | Aihara et al. | 248/430 |
| 4,892,282 | 1/1990 | Suzuki et al. | 248/430 |
| 4,941,637 | 7/1990 | Pipon | 296/65.1 X |

Primary Examiner—Gary L. Smith
Assistant Examiner—Michael J. Milano
Attorney, Agent, or Firm—Oldham & Oldham

[57] ABSTRACT

A slide rail used in a seat, which is of such type having an upper rail of generally inverted U-shaped section and a lower rail fitted in the upper rail slidably. In the opened area of such upper rail, there is provided a reinforcing member, in a manner extending transversely therein. In both lower rail and reinforcing member, plural lock holes are formed, and through all lock holes is engaged or disengaged a lock pawl associated with locking mechanism, for locking or unlocking the two rails, which provides a positive locking effect and robust structure.

3 Claims, 3 Drawing Sheets

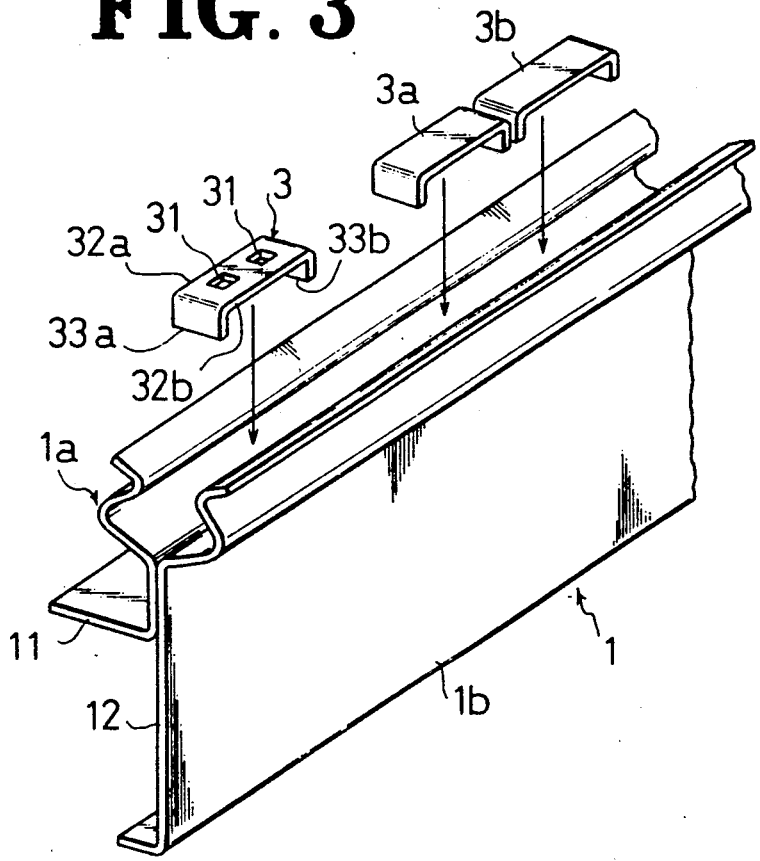
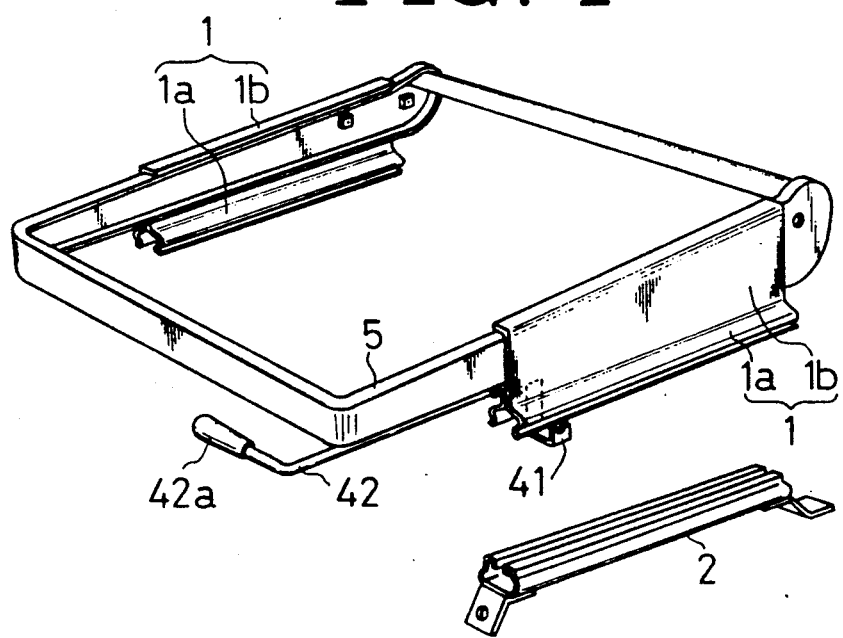

SLIDE RAIL FOR AUTOMOTIVE SEAT

BACKGROUND OF THE INVENTION

1. Field of the Invention

The present invention relates to a slide rail for permitting a sliding movement of an automotive seat in the foreward and backward directions and adjustment thereof.

2. Description of Prior Art

Particularly, a wobbling or rattling is easy to occur in such construction of slide rail wherein an upper rail of an inverted U-shaped configuration in section is slidably fitted within a lower rail, the upper rail being fixed to a seat and the lower rail being fixed to a floor of the automobile. This is because a load or external force is applied to the slide rail in a direction transversely thereof, resulting in the upper rail being deformed relative to the lower one.

To solve this problem, there has been proposed a slide rail as shown in FIG. 1, which is constructed in the abovementioned manner, with a roller (30') being provided in the inverted U-shaped part of the upper rail (1'). The roller (30') is, therefore, effective in preventing the upper rail (1') against deformation. Designation (6') denotes balls disposed between the upper and lower rails (1')(2') for facilitating a slidability of the upper rail (1') with respect to the lower one (2').

However, such prior art has been found defective in its locking mechanism (4'). As shown, the locking mechanism (4') comprises a lock hole (21') perforated in the bottom of the lower rail (2'), a lock plate (41') having a lock pawl (41'a) to be engaged into the lock hole (21'), and a control spindle (42') fixed to the lock plate (41'). The control spindle (42') extends along the longitudinal direction of the lower rail (2') in parallel therewith, and is rotatably supported by a bracket (43') fixed to the standing part of the upper rail (1'). Thus, by rotating the control spindle (42'), the lock pawl (41'a) of the lock plate (41') is disengaged from or into the lock hole (21'), to thereby unlock or lock the upper rail (1') to the lower one (2'). But, if a great load is exerted upon the upper rail (1'), making effort to forcibly slide it along the lower rail (2'), the lock pawl (41'a) or the mating lock hole (21') is easily deformed or damaged, because of their simple interconnection.

SUMMARY OF THE INVENTION

With the above-stated drawbacks in view, it is therefore a purpose of the present invention to provide an improved slide rail of the type having an upper rail of generally inverted U-shaped configuration in section and a lower rail slidably fitted in such upper rail, which prevents deformation of the upper rail and provides a positive locking of the upper and lower rails.

In achievement of the purpose, in accordance with the present invention, a reinforcing member is provided within such upper rail in a manner extending transversely thereof. The reinforcing member is formed with a lock hole cooperable with a locking mechanism provided on the slide rail for locking the upper rail agaist the lower rail. In other words, according to the invention, the locking mechanism includes a plurality of holes formed in the lower rail and a lock plate movably supported on the upper rail, the lock plate having a lock pawl to be engaged into and disengaged from one of the lock holes, whereupon, according to the invention, the lock pawl is engaged through the first lock hole of the lower rail and second lock hole of the reinforcing member.

Accordingly, the provision of the reinforcing member in the opening hollow of the upper rail make robust enough to resist against a force being applied to the upper rail in a transverse direction, thus protecting the upper rail against deformation, and the engagement of the lock pawl through the first and second lock holes respectively of the reinforcing member and lower rail, provides a dual locking structure, which insures not only a positive locking of the upper and lower rails, but also an increased rigid structure.

BRIEF DESCRIPTION OF THE DRAWINGS

FIG. 3 is a partially broken, partly exploded perspective view of the principal part of the invention;

FIG. 4 is a perspective view of the slide rail;

DETAILED DESCRIPTION OF PREFERRED EMBODIMENT OF THE INVENTION

Referring to FIGS. 2 through 5, which illustrates a slide rail, and is designated by (S), in accordance with the present invention.

Figure 1:
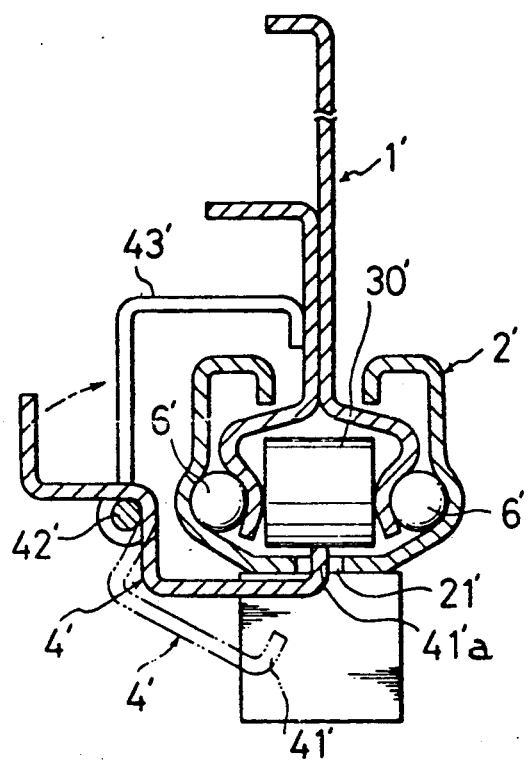
FIG. 1 is a longitudinally sectional view of a conventional slide rail.
Figure 2:
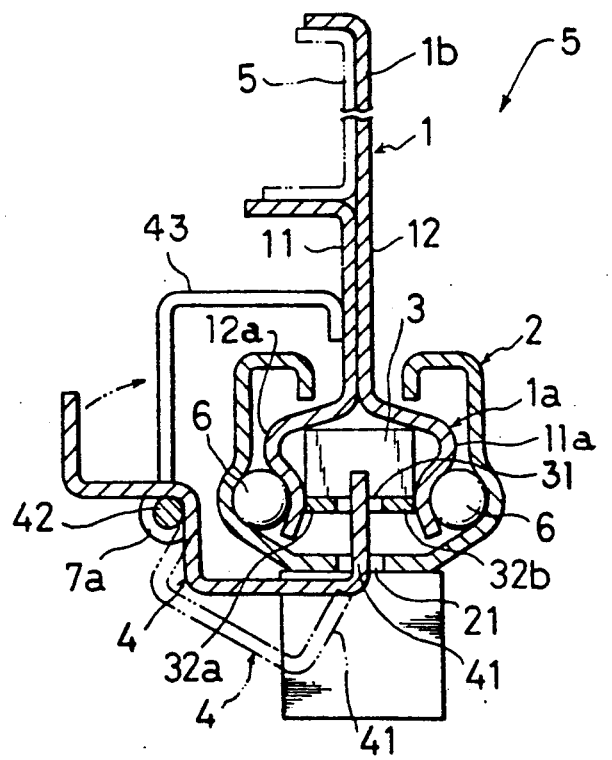
FIG. 2 is a longitudinally sectional view of a principal part of a slide rail in accordance with the present invention.

The slide rail (S) is basically comprised of an upper rail (1) and a lower rail (2). As best shown in FIGS. 2 and 4, the upper rail (1) is formed by a pair of rail half members (11)(12) each having an outwardly projected lower part (11a, 12a), forming thus an inverted U-shaped lower section (1a) in the upper rail (1), and the lower rail (2) is formed in a generally U-shaped configuration in section. The inverted U-shaped lower section (1a) of the upper rail (1) is slidably fitted in the lower rail (2) via balls (6).

The upper rail (1) is fixed at its mounting part (1b) to a seat frame (5) upon which is seat (not shown), and the lower rail (2) is fixed on the floor of an automobile, though not shown.

In this connection, the upstanding mounting part (1b) may be constituted as a seat frame, to support a seat cushion, and at the mounting part (1b), a seat height adjusting device may be provided in order to enable raising or lowering the seat frame (5).

Figure 5:
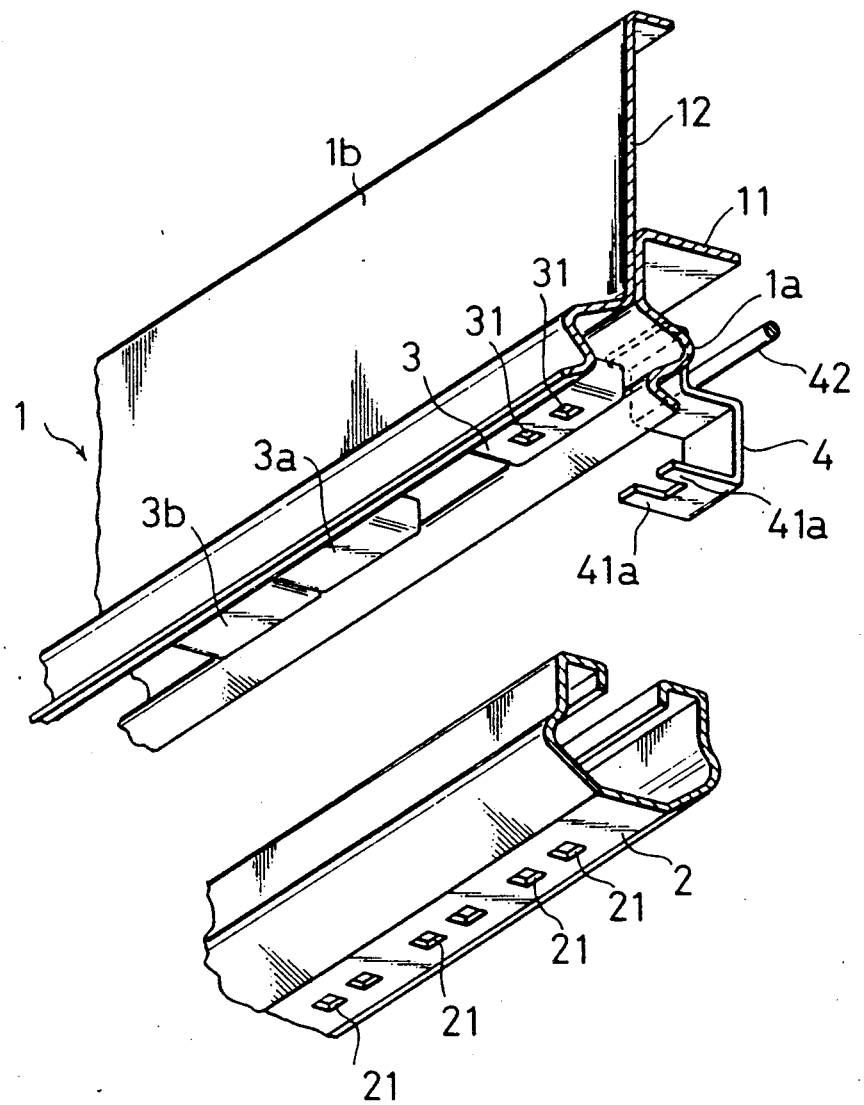
FIG. 5 is a partially broken, partly exploded perspective view which shows the principal part of the invention as viewed from below.

As understandable in FIGS. 2, 3 and 5, within the inverted U-shaped section (1a) of the upper rail (1), there are fixedly provided a plurality of reinforcing members (3, 3a, 3b) by means of a welding. Each of the reinforcing members is made of a plate material bent into a generally U-shaped configuration, and the first reinforcing member (3) is a principal part of the present invention. The first reinforcing member (3) is formed at its horizontal part with a pair of spaced-apart lock holes (31)(31), having a pair of legs (32b)(32b) formed at both ends, as best seen from FIG. 3.

The slide rail (S) is equipped with a locking mechanism (4) for unlocking and locking the upper rail (1) against the lower rail (2). As can be seen in FIGS. 2, 4 and 5, the locking mechanism (4) comprises a lock plate (41) having a pair of spaced-apart lock pawls (41a)(41a) integral therewith, a control spindle (42) to which is fixed the lock plate (41), the control spindle (42) being provided at its forward end with a handle (42a), and a plurality of equidistant lock holes (21 . . . ) which is formed in the bottom portion of the lower rail (2), extending along the longitudinal direction thereof. As in FIG. 2, the lock pawls (41a)(41a) are to be engaged into or disengaged from two mating ones of those plural lock holes (21 . . . ) as well as into or from the respective second two lock holes (31)(31) of the reinforcing member (3). The control spindle (42) is rotatably supported by a bracket (43) fixed to the upstanding area of the upper rail (1).

It is noted that the first reinforcing member (3) is disposed within the inverted U-shaped section (1a) such that its two lock holes (31)(31) are aligned with two mating ones of the lock holes (21 . . . ) at the lower rail (2), so that the two lock pawls (41)(41) are engaged through those aligned lock holes (21)(31).

The reinforcing member (3) is at its two legs (33a)(33b) welded to the inner wall of the inverted U-shaped section (1a) and at its two lateral edges (32a)(32b) welded to the respective inwardly curved areas (11a)(12a) of the inverted U-shaped section (1a). Other two reinforcing members (3a)(3b) are likewise welded to the inverted U-shaped section (1a).

Accordingly, operation of the control spindle (42) causes rotation of the lock plate (41) about the axis of the spindle (42), thereby engaging or disengaging the two lock pawls (41)(41) into or from the respective first pair of lock holes (21)(21) and second pair of lock holes (31)(31).

With the above-described structure, it is appreciated that the provision of the reinforcing members (3, 3a, 3b) within the upper rail (1) resists against a force being applied to the upper rail (1) in a direction transversely thereof, thus ensuring to protect the upper rail (1) against deformation or damage, and providing a long durability in the slidability of upper rail (1) relative to the lower one (2), and the engagement of the two lock pawls (41a)(41a) of the lock plate (41) through the first lock holes (21) at the lower rail (2) and the second lock holes (31) at the upper rail (1) provides a dual locking structure which not only insures the locking of the upper rail (1) to the lower rail (2), but also protects the lock plate (41) against deformation or damage, even if it is applied a great load.

What is claimed is:

1. A slide rail for an automotive seat comprising:
   an upper rail having a generally inverted U-shaped part opened downwardly thereof;
   a lower rail in which said upper rail is slidably fitted, said lower rail being at its bottom part formed with a lock hole;
   a locking means for locking and unlocking said upper rail to and from said lower rail, said locking means having a lock pawl to be engaged through said lock hole of said lower rail; and
   a plurality of reinforcing members of a plate-like material; each reinforcing member are formed by bending both ends into a generally U-shaped configuration having two bent end portions, said plurality of reinforcing members being provided within said generally inverted U-shaped part of said upper rail in such manner as to extend transversely thereto, contacting their respective lateral sides with inner walls of said upper rail, and further said reinforcing members being each formed with a lock hole into which said lack paul of said locking mans is to be engaged,
   whereby said upper rail is protected against deformation or damage.

2. The slide rail according to claim 1, wherein said two bent end portions of said reinforcing members are welded to the upper inner wall of said upper rail.

3. The slide rail according to claim 1, wherein said locking means is provided at said upper rail and wherein said lock pawl of said locking means is to be engaged through said lock holes respectively of said lower rail and reinforcing means.

* * * * *